Figure 2:
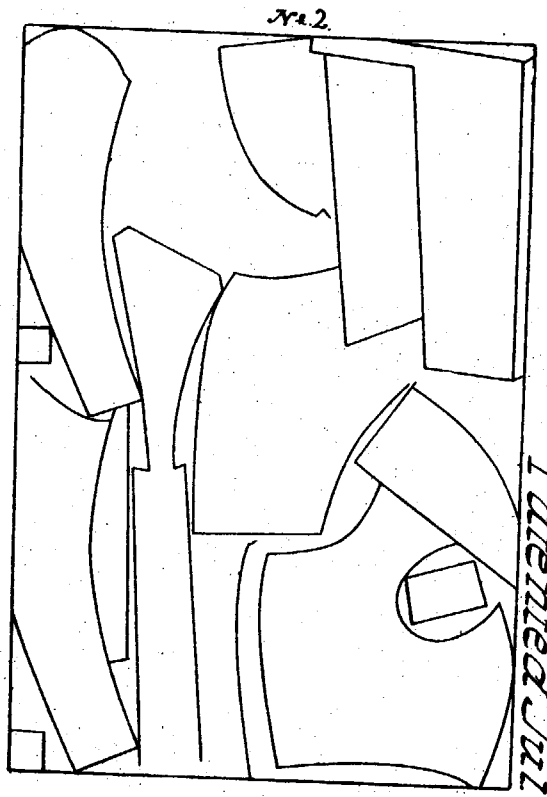
Figure 1:
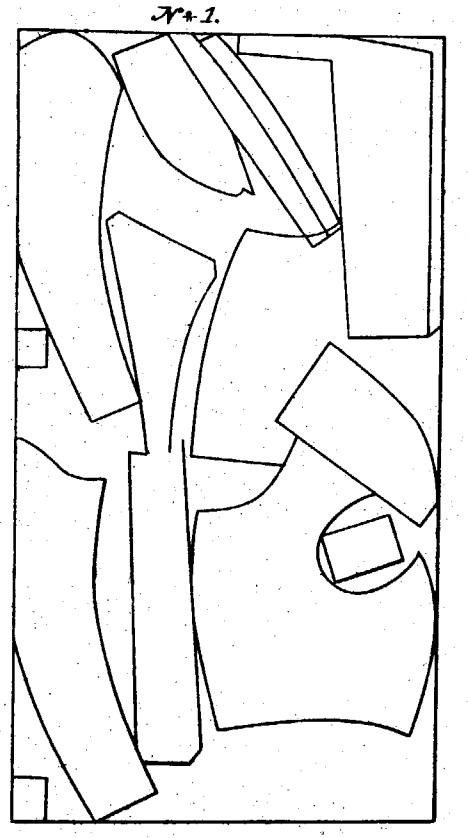
Figure 6:
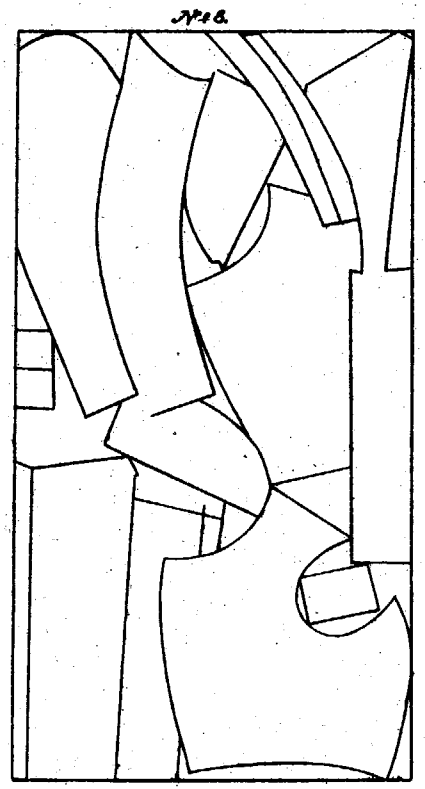
Figure 7:
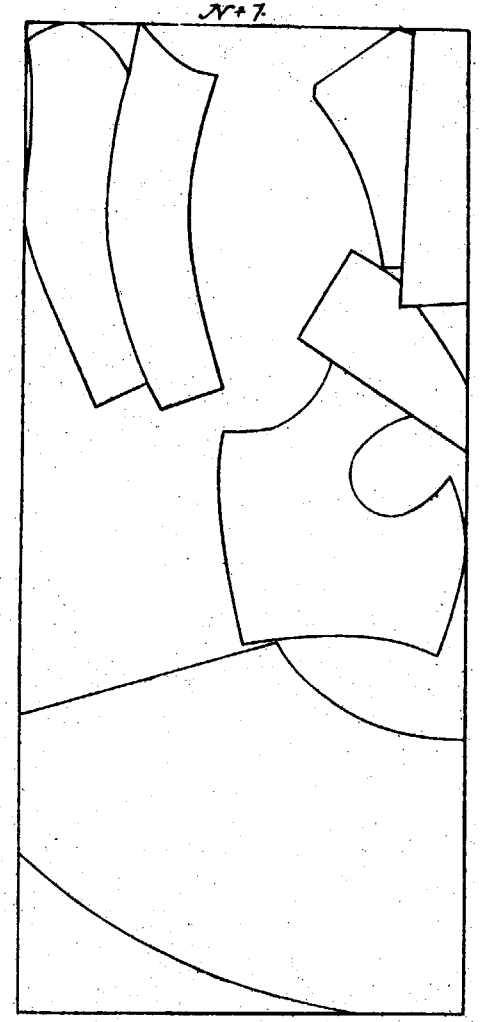
Figure 11:
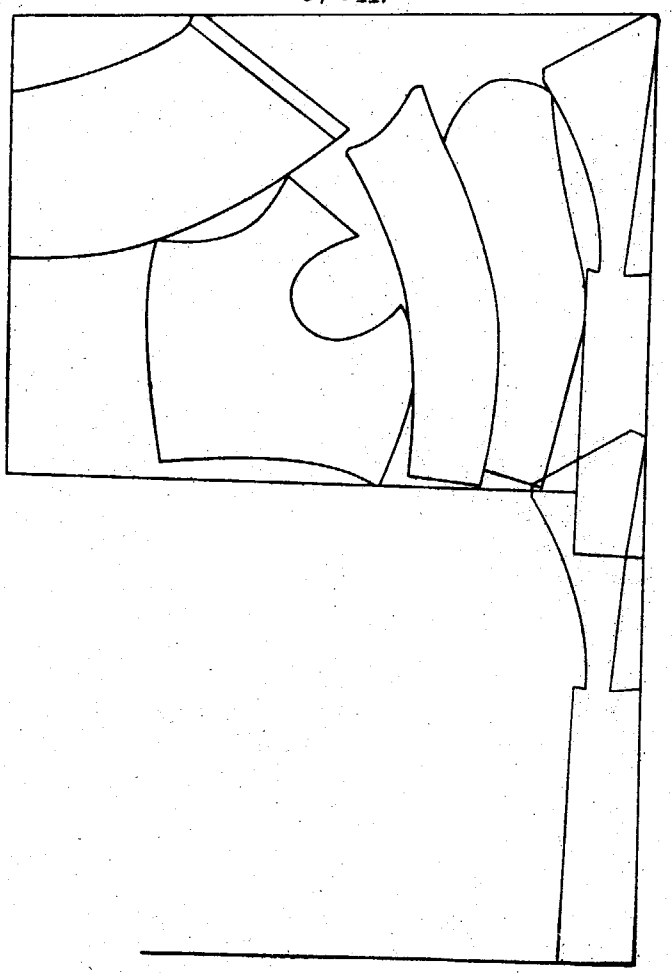
Figure 10:
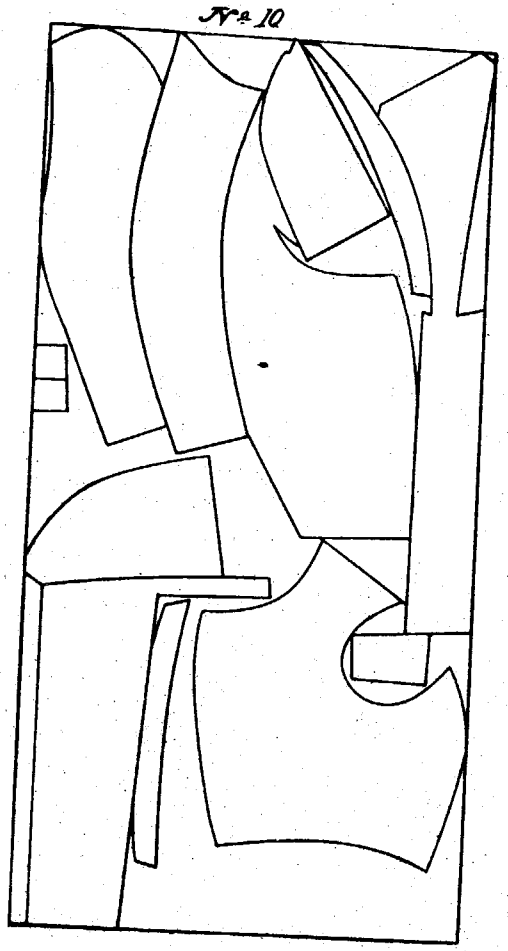
Figure 13:
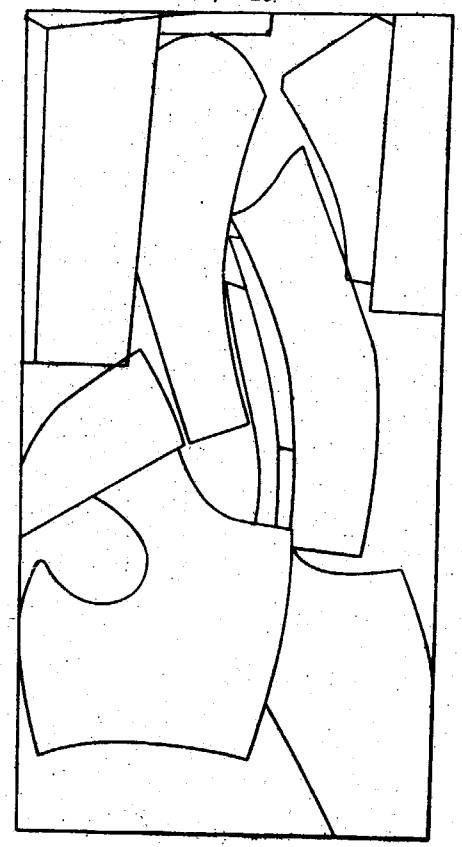
Figure 12:
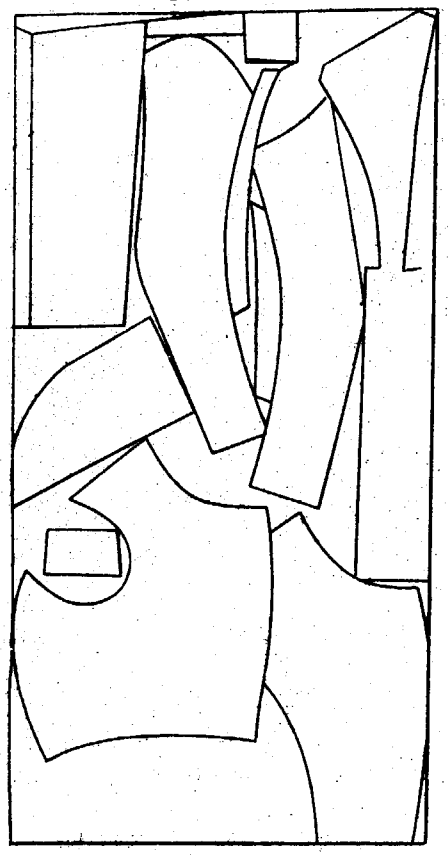

9860X
Sheet 1-11 Sheets.
J. Zwisler Jr.
Tailoring.
Patented Jul. 1, 1836.
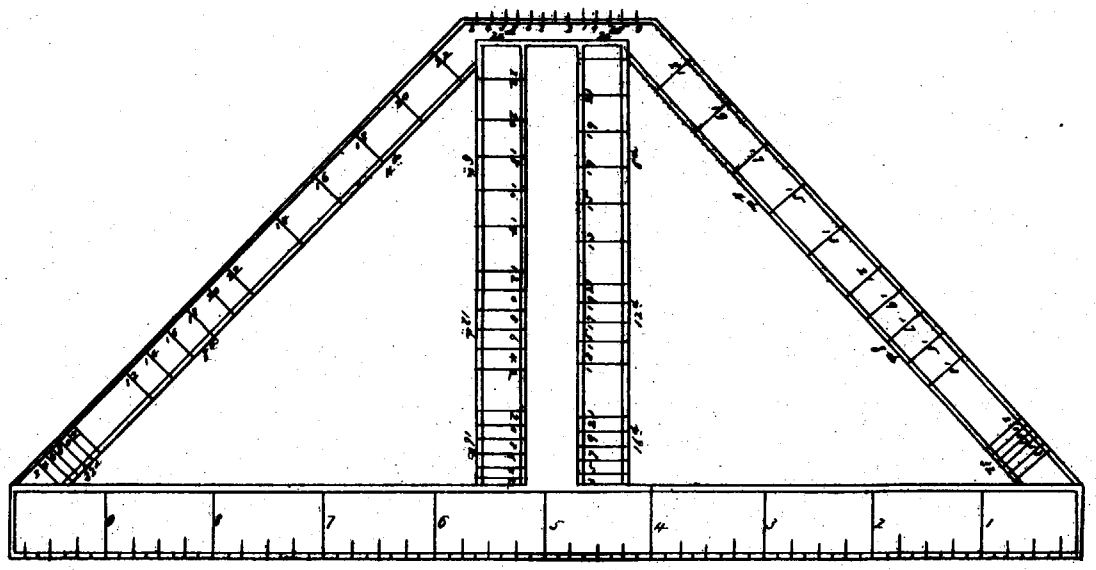

9860X
Sheet 2. 11 Sheets.
J. Zwisler Jr.
Tailoring.
Patented Jul. 1. 1836.
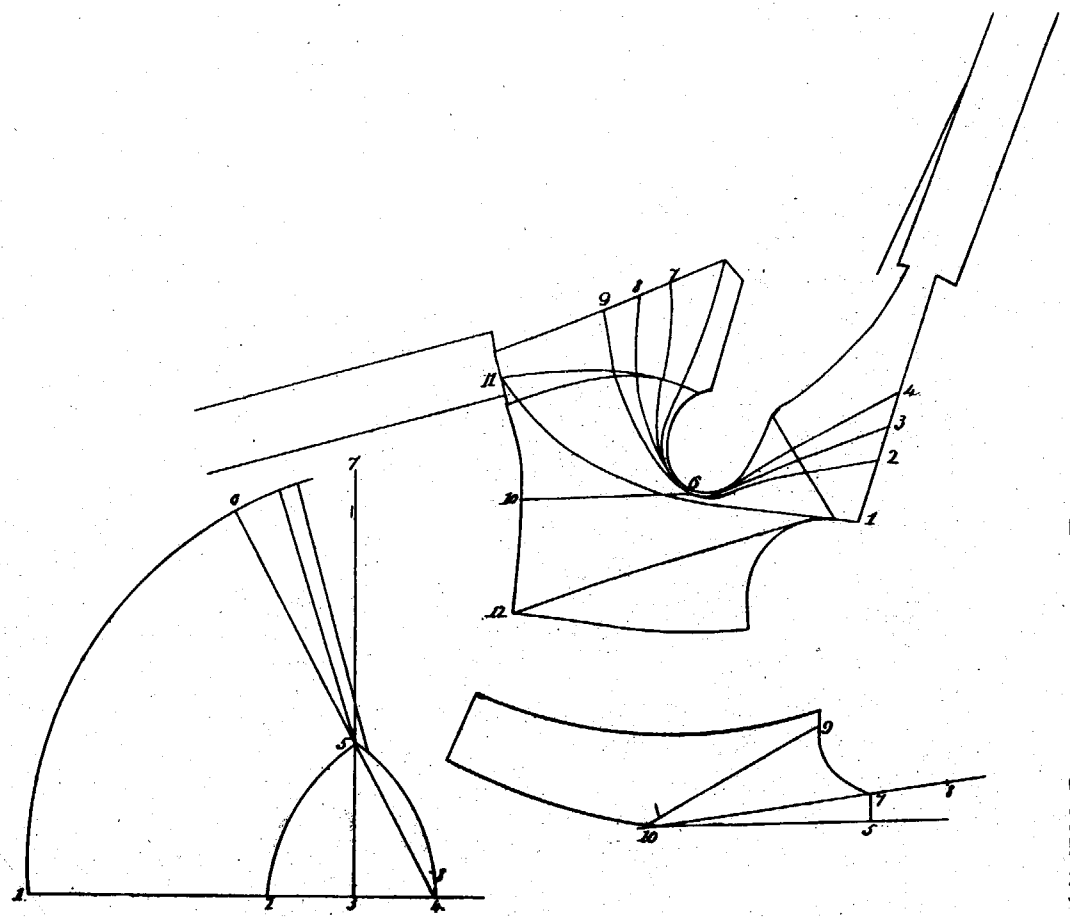

9860X
J. Zwisler Jr.
Tailoring.
Patented Jul. 1. 1836
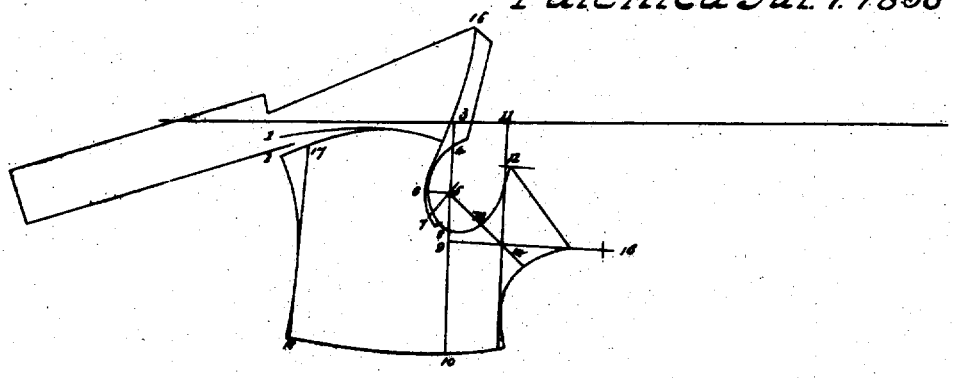
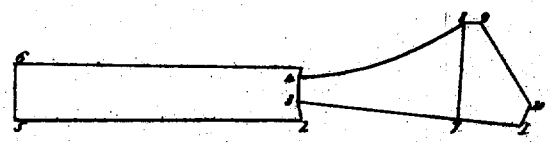
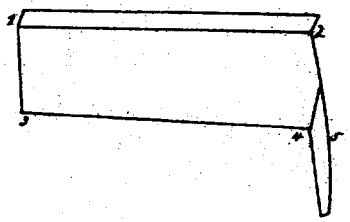
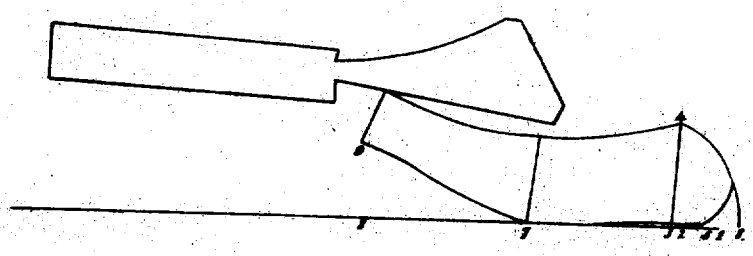

9860X
Sheet 4. 11 Sheets.
J. Zwisler Jr.
Tailoring.
Patented Jul. 1. 1836.
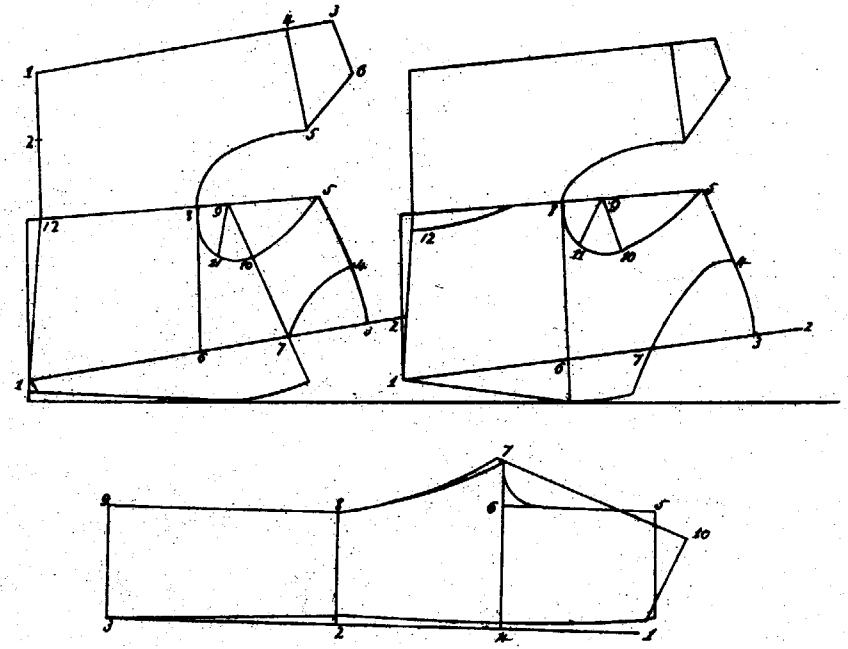

9860X

Sheet 5. 11 Sheets.

J. Zwisler Jr.

Tailoring.

Patented Jul. 1. 1836

9860X
Sheet 6. 11 Sheets
J. Zwisler Jr.
Tailoring.
Patented Jul. 1. 1836
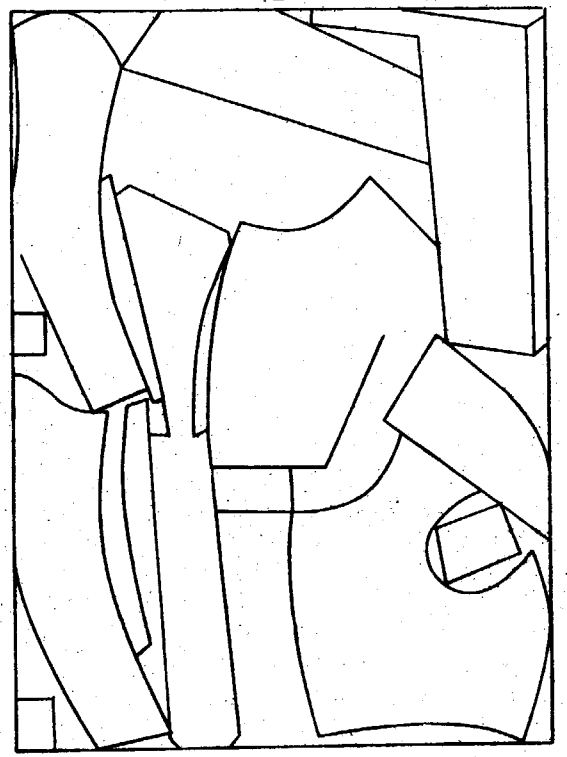
No. 5.
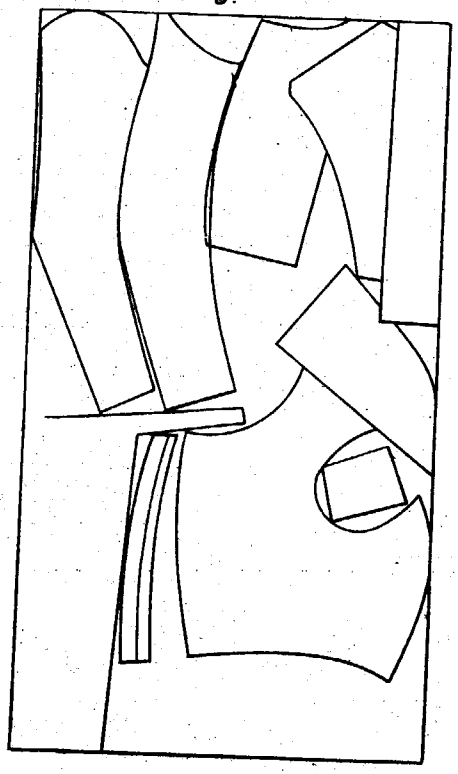
No. 3.

9860X
Sheet 7. 11 Sheets.
J. Zwisler Jr.
Tailoring.
Patented Jul. 1. 1836.
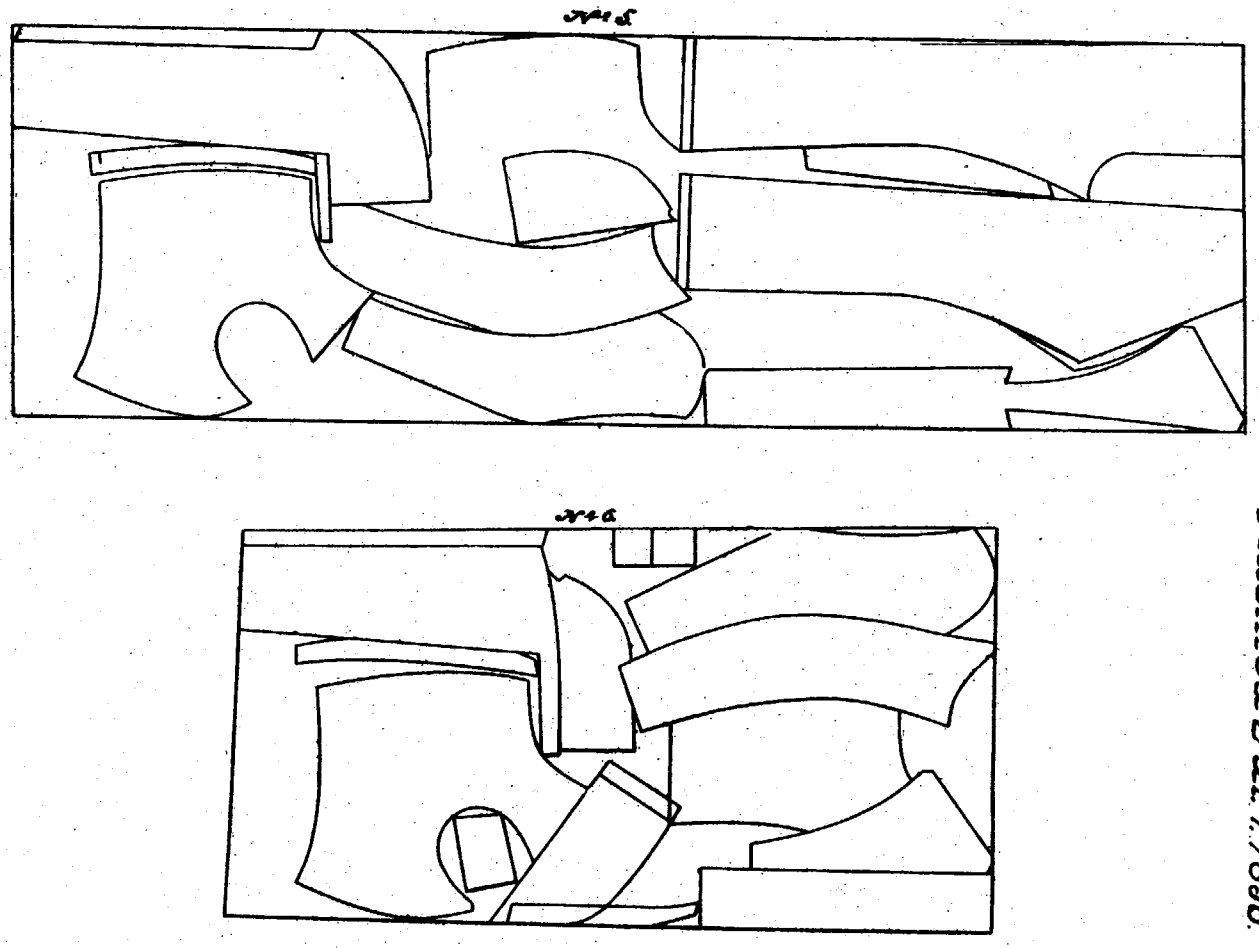

9860X

J. Zwisler Jr.

Tailoring

Patented Jul. 1. 1836

9860X J. Zwisler Jr.
Tailoring.
Patented Jul. 1. 1836
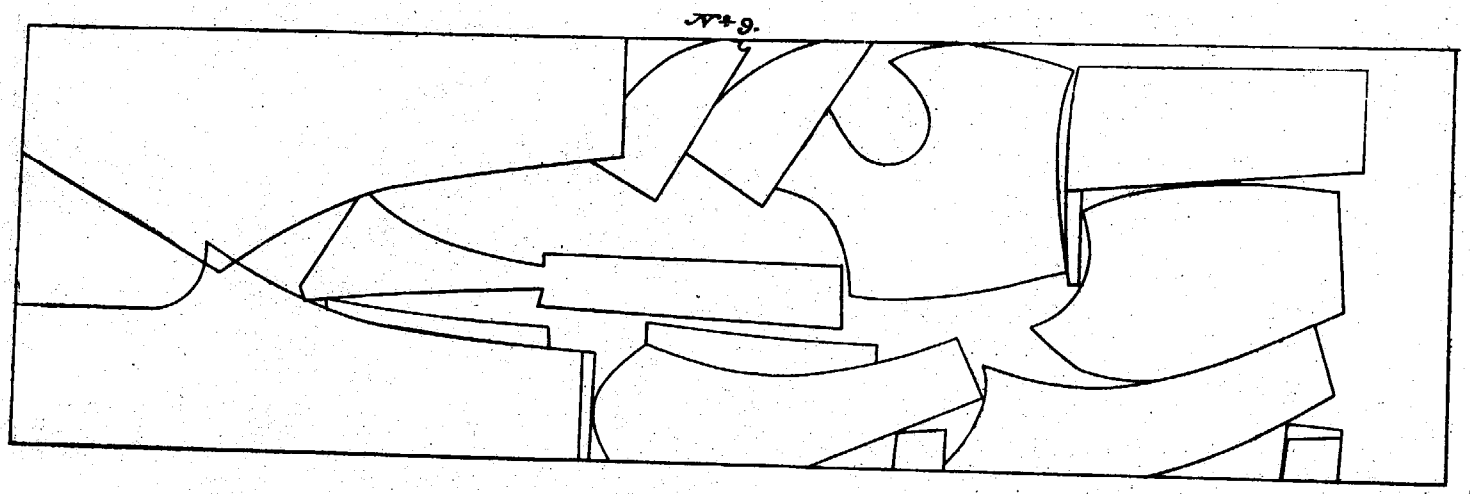

9860X

J. Zwisler Jr.

Tailoring.

Patented Jul. 1. 1836.

No Printed Specification. Available

Sheet 11. 11 Sheets.

9860X

J. Zwisler Jr.

Tailoring.

Patented Jul. 1. 1836

July 1, 1836

James Zwisler Jr. of Washington Co. Md 9860X
Letters Patent

The schedule referred to in these Letters Patent, and making part of the same containing a description in the words of the said James Zwisler Jr. himself of his improvement in the art of Tailoring:

To all to whom these presents shall come: Be it known that I James Zwisler Jr in the County of Washington and State of Maryland, have invented a new and useful improvement in the art of Tailoring, and that the following is a full and exact description of the said art of Tailoring as invented or improved by me viz: Economical and improved systematic Tailors guide.
Description of the use of the square and improved systematic Tailors guide, the square supersedes the necessity of separate scales, the rule does not rely on the breast measure but makes every measure except the division of scye and shoulder measure out itself. The ballance measure of scye is relied upon as insuring to bring the fore part in its proper place, making good fits and giving ease and comfort to the customer, the proof measures may be used or not; but if practised will give great satisfaction. The inventor of this work should not have thought of obtaining a patent for the art of fitting, owing to the numerous rules that have been introduced with an eye single to that purpose - had it not been for the discovery of cutting a suit of clothes out from 1/2 to 3/4 of a yard less cloth, than the usual manner of cutting & a coat out of 3/8 to a 1/2 a yard of less cloth. I have long thought that a system, marking off the whole coat would afford great facility in cutting to an old practitioner, and more especially to young beginners without reference to saving: therefore, through practical experience discovering a complete system and mathematical principle in saving cloth. I determined to secure to myself a patent upon the principle of laying off the whole coat and pantaloons, representing different sizes, according to width of cloth, and a rule of fitting tested by practical experience - Explanation of sizes -
Draft No. 1. cloth six quarters 1/2 yard of cloth, size of coats. length of coat 36 inches breast 33 waist 31 sleeve 33 - Draft No. 2. cloth scant 7 quarters

9860X one and three eighths of cloth, length 40 inches, breast 35, waist 31. Sleeve 35. Draft No. 3. cloth six quarters one yard and a half of cloth length 39 inches. breast 37 waist 33. Sleeve 34½. Draft No. 5. six quarter cloth coat and pantaloons, length of coat 40 inches breast 36 inches. waist 32. Sleeve 35, length of pantaloons 44 inches, knee 8, bottom 9. waist 32. Draft No. 6. cloth six quarters one yard and a half of cloth, length 38 inches, breast 34 waist 32. Sleeve 35. Draft No. 7. cloth six quarters 2 yards of cloth frock coat, length 39 inches, breast 35, waist 32. Sleeve 35. Draft No. 8. cloth 29 inches wide, one and a half yard of cloth, length 39 inches, breast 35. waist 32. Sleeve 35. Draft No. 9 coat and pantaloons, cloth six quarters 3 yards of cloth 39 inches, breast 42 waist 40. Sleeve 35. Draft No. 10 cloth six quarters one and five eighths of cloth, length 40 inches, breast 36, waist 32, Sleeve 35. Draft No. 11 a frock coat without whole piece, 37 or 38 inches long 36 breast 34 waist 2 yards and a quarter full pattern.

In addition to the above I make known that the principle of economy in saving cloth is claimed. viz: that the fore part is cut below the back or skirt securing the outside collar between them. Seven quarter cloth, the sleeves, cuff, skirt and fore part are cut previous to cutting the back (See draft No. 1 & 2) Six quarter cloth in securing the skirt facing below at fore part (See drafts No. 6 & 10). To cut the frock coat without neck piece the backs are cut opposite each other, the cloth is then split (See draft No. 11).

Proof measures have been introduced I believe by Letters Patent, the principle I have understood to start either from top of back or from back to back. my proof measures divide the shoulder measure at No. 6. then passes over the Top of shoulder and reverses the measure and passes over the shoulder blade, thereby dividing the fleshy or bony part of man more proportionally which I believe to be, and claim as an improvement the accompanying drafts are to be taken as part of my specification.

James Zwisler Jr.

Witnesses
Peter Seiler Jr.
Richard Shackles

1. Explanation of Skirt of Frock Coat. From 1 to 2 is length of skirt. 2 to 3 is 4th of waist. 3 to 4. is 4th of do. 3 to 5 is sweep from 5 to 2, placing the measure or string on 4 do, by placing the measure or string on 2, line drawn through

9860X

4 & 5 to 6 spring for an over coat, spring of frock coat between six and seven.
4 to 8 is 8th placing the back on the Skirt, then sweep the bottom of skirt by pla-
cing the measure or String on 8 –
2. Explanation of proof measure of fore part – From 1 to 2 is 5th of shoulder meas-
ure, 2 to 3 is 5th of do. do. 3 to 4 is ½ of 3 and 2 – The guides on the back are
the same – 1 to 6 is 1 hf of shoulder measure . 6 to 2 is first proof measure . 6 to
4 is 2d proof . 6 to 3 is 3d do . 6 to 7 is 4th do . 6 to 8 is 5th do . 6 to 9th is 6th do . 6
to 10 is 7th do . 1 to 11 is 8th do . 1 to 12 is 9th do –
Explanation of proof under Sleeve – From 5 to 7 is 8th . 7 to 8 is width of back
. 8 to 9 is 1 hf shoulder measure by coming from . 8 to 7 and from 7 to 9 . 10 to
9 is the measure of under sleeve.

1309 words [illegible] Drawing

Ex'd 11.9[illegible]